J. S. SOUREK.

ROPE, CHAIN, OR WIRE STRETCHER.

APPLICATION FILED FEB. 8, 1911.

Reissued May 2, 1911. 13,233.

Witnesses:

Austin B. Nauscom

A. L. McClintock

INVENTOR-

Joseph S. Sourek,

BY C. E. Humphrey

ATTORNEY.

THE NORRIS PETERS CO., WASHINGTON, D. C.

UNITED STATES PATENT OFFICE.

JOSEPH S. SOUREK, OF BATH TOWNSHIP, SUMMIT COUNTY, OHIO.

ROPE, CHAIN, OR WIRE STRETCHER.

13,233. Specification of Reissued Letters Patent. Reissued May 2, 1911.

Original No. 976,941, dated November 29, 1910, Serial No. 563,787. Application for reissue filed February 8, 1911. Serial No. 607,430.

*To all whom it may concern:*

Be it known that I, JOSEPH S. SOUREK, a citizen of the United States, residing at Bath township, in the county of Summit and State of Ohio, have invented certain new and useful Improvements in Rope, Chain, or Wire Stretchers, of which the following is a specification.

This invention relates to devices for stretching rope, chains, cables, wire and the like and the object thereof is to provide a simple and effective device for tightening or taking up an unlimited amount of slack in rope, chain, wire or similar devices embodying a support preferably in the form of a pair of spaced bars adapted to be suitably anchored provided with a clamp to prevent backward movement of the rope and a stretching element mounted for oscillatory movement on said bars arranged to stretch a rope or similar device and advance the slack therein to said clamp, whereby the same is held during the rearward or inoperative movement of said stretching element.

A still further object of this invention is to produce a device for the purpose described, which will be strong, safe, durable, easily constructed, readily applied and capable of performing in an efficient manner all the necessary functions of a device of this character.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, illustrated by way of example in connection with a rope having attached thereto a wire to be tightened, with the device anchored to a suitable support, but it is to be understood that changes, variations and modifications can be resorted to which come within the scope of the claims hereunto appended.

Figure 1:
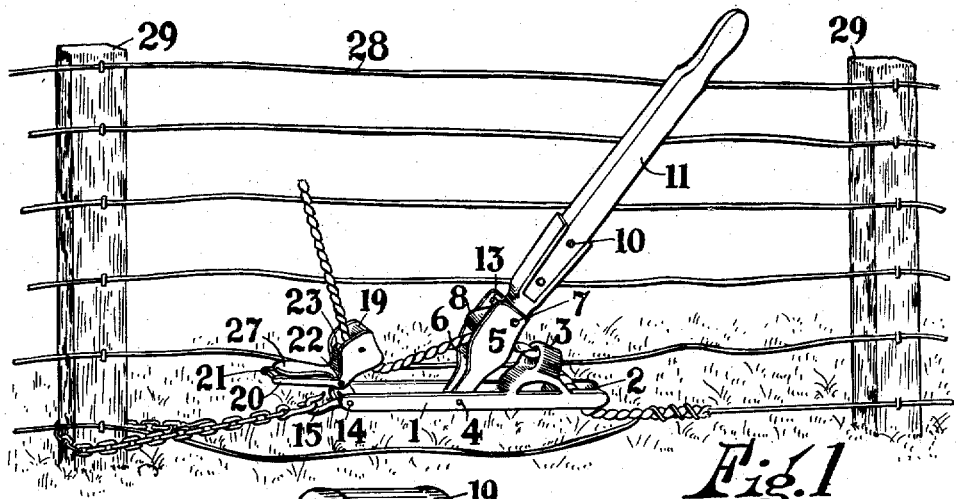
Figure 3:
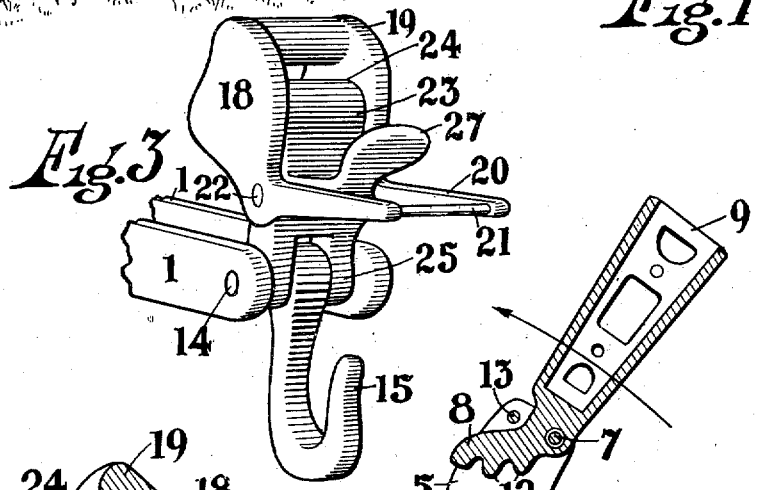
Figure 2:
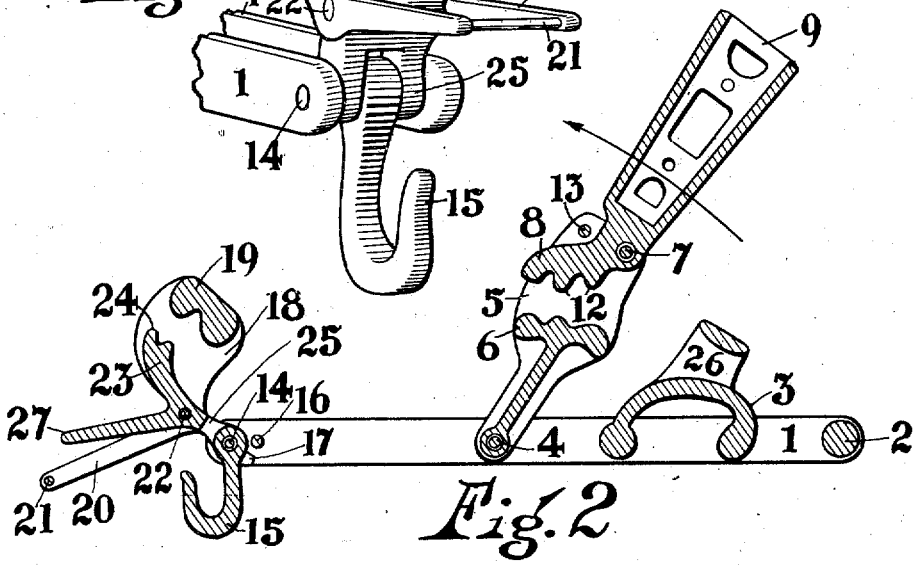

In the drawings, in which similar reference numerals indicate like parts in the different figures: Figure 1 is a perspective view of a device embodying this invention, shown in operative relation with respect to a rope adapted to tighten a wire. Fig. 2 is a vertical, central, longitudinal, sectional view of the device shown in Fig. 1; and Fig. 3 is a perspective view of the end of the device looking from the left in Fig. 1.

Before entering upon a detailed description of this invention, it will be stated that in the specification and claims, the words "flexible member" will be used generically to designate any type of similar device such as a chain, hawser, cable, wire or wire rope in order to save unnecessary repetition.

Referring specifically to the drawings, the reference numerals 1, 1, denote spaced companion bars adapted to support the mechanism to be hereinafter described. Extending between the bars 1, 1, at one end of the device is a cylindrical member 2 constituting a rope guide. Adjacent this rope guide 2 and preferably formed integral with the bars 1, 1, is an upwardly-extending frame 3 provided with an aperture 26, preferably inclined, through which the rope may be passed and constituting an auxiliary guide therefor. Adjacent to the guide 3 and mounted within and bridging the space formed between said bars 1 is a pivot pin 4 to which is pivotally connected the advancing or stretching element for the flexible member, the latter being a rope, chain or cable, the said element consisting of a gripping member and a gripping lever. The gripping member includes a pair of upright spaced plates 5 having interposed between the lower portion thereof formed integral therewith a jaw 6, having its gripping face preferably serrated as shown in Fig. 2, and which maintains the plates 5 in spaced relation. The lower end of the plates 5 are provided with alining apertures through which extends the pin 4, whereby the gripping member is pivotally connected with the bars 1. The gripping lever includes a jaw 8 having its lower terminus provided with a serrated gripping face 12 which opposes the gripping face of the jaw 6. The gripping lever further includes a socket forming means 9 which projects from one terminus of the body of the jaw 8 and has secured therein through the medium of the holdfast devices 10 the lower end of the handle 11, which is utilized for operating the gripping lever with respect to the gripping member and further employed for shifting the stretching element on the pivot pin 4. The jaw 8 extends between the upper portion of the plates 5 and in proximity to its gripping face 12 is pivotally connected to the plates 5 by a pivot pin 7 arranged near the upper end of and bridging the space between the plates 5. The gripping faces of the jaws 6 and 8 coöperate to grip a flexible member, such as a rope, chain or cable when the handle 11 is swung in the direction of the arrow, Fig. 2 and to release the flexible member when the handle 11 is moved in the opposite direction. Positioned between the plates 5 above the pivot pin 7 is the stud 13 for arresting the outward movement of the lower end of the jaw 8 when it is on its return stroke and free from gripping engagement with the flexible member.

Extending between the spaced bars 1, 1 and in advance of the pin 4 is a pin 14 mounted on which is a hook 15 designed to constitute means for securing the device to a suitable anchorage, as clearly shown in Fig. 1, but it will be apparent that other means such as a loop or other similar or equivalent device may be employed in place of the hook 15. Extending between the companion bars 1, 1 in the rear of the pin 14 is a pin 16 to constitute a stop for preventing rearward movement of the hook when not in use, the latter preferably provided with a shoulder 17 for engaging said pin for the foregoing purpose. The pin 14 also constitutes a pivot for a rope clamp which is mounted thereon consisting of a skeleton frame 18 provided interiorly with an integral, serrated jaw 19 to constitute one member of a rope clamp. The lower portion of the frame 18 is formed with a pair of parallel, forwardly-projecting arms 20 united at their outer ends by an integral cross bar 21. Extending between the side members of the frame 18 is a pin 22 on which is mounted a movable jaw member 23 having the upper portion thereof preferably formed with serrated teeth 24, cooperating with the jaw 19 in clamping a rope. The lower portion of the member 23 is provided with a pair of spaced lugs 25 properly apertured to receive the pin 14 on which the member 23 is pivoted. The lugs 25 are spaced apart so that in setting up the device the hook 15 can be positioned between them on the pin 14. The member 23 is also provided with an outwardly-extending finger or trip 27 adapted to move in the space inclosed by the parallel arms 20 and the cross bar 21 and to normally lie in parallel relation therewith.

One of the means for employing this device is as follows and is illustrated in Fig. 1, in which the device is used in drawing up the slack or tightening the wires 28 of a fence, provided with ordinary supporting posts 29. In using this device experience has demonstrated that it is preferable to use a short piece of rope in immediate relation with the device and to secure the wire to be stretched to the rope and thereby avoid any crimping or abrading of the surface of the wire by the stretching element of the device. The rope is preferably passed, although not necessarily, under the cylindrical member 2 and upward through the opening 26 in the guide 3 between the jaws 6 and 8 of the stretching element and from thence outwardly between the serrated portions of the jaws 19 and 23. After this, a wire to be stretched, is suitably connected with the rear end of the rope, as clearly shown in Fig. 1 and a suitable instrumentality connects the hook 15 with a suitable anchorage such as the post shown in the same figure. The operator then grasps the rope in advance of the clamp mounted on the pin 14 and draws up all possible slack. He then moves the handle 11 rearwardly until the lower jaw 6 encounters the guide 3. The handle 11 is then moved in the direction of the arrow in Fig. 2 which causes the serrated faces of the jaws 6 and 8 to tightly grip the rope and advance it toward the clamp carried by the pin 14. As fast as the rope is advanced by means of the stretching element carried on the handle 11, it is drawn freely through the clamp on the pin 14 by the other hand of the operator, thereby keeping the rope between the lever and the clamp taut at all times. As soon as the handle 11 has been advanced toward the clamp as far as possible, the operator reverses the movement of the handle, which movement separates the jaws 6 and 8, releasing their hold upon the rope which causes, simultaneously therewith, a gripping action of the serrated faces 19 and 24 on the same, due to the tension of the rope, which by this time will exert a required pull on the rope clamp to cause it to engage operatively the rope placed therein. This movement of the handle 11 is kept up until sufficient tension has been imposed upon the wire, after which the wire is secured fixedly in position by suitable holdfast means to a post and the handle 11 moved to inoperative position, releasing its grip on the rope. In order to release the rope from tension to permit the removal of the device, a slight pressure downwardly upon the trip 27 will separate the members of the clamp carried by the pin 14 sufficiently to relieve all tension thereon. The upper member 8 of the lever is held in position, when thrown backward, by means of the stop or pin 13 constituting an abutment therefor.

What I claim is:—

1. A device for stretching ropes and the like comprising a pair of spaced companion bars, a plurality of pins extending between said bars, one of said pins positioned near the front ends of said bars, a rope clamp provided with a manually-operable releasing mechanism pivotally-mounted on said latter pin, a member also mounted on said pin constituting an anchorage for said device, a gripping lever mounted on one of said pins between said bars consisting of a lower portion provided with means to receive said pin having a fixed jaw and with a lateral member integral therewith, a pin carried by said lateral member, a lever provided with a rope-gripping jaw adapted to coöperate with said fixed jaw pivotally-mounted on the pin on said lateral member, said jaws, adapted when moved in one direction to grip and advance a rope toward said clamp and inoperative when the movement of said lever is reversed, and a pin constituting an abutment carried by said lateral member adapted to limit the inoperative movement of said lever.

2. A device for stretching a flexible member comprising a supporting structure, a clamp connected to and arranged in a plane above said structure, means connected to said structure for anchoring it loosely between its anchorage and the taut portion of said member, a gripping member including a body-portion pivotally connected to and arranged in a plane above said structure rearwardly of said clamp and formed of a pair of spaced upright plates having interposed therebetween and formed integral therewith a fixed jaw, a lever pivotally connected in proximity to its lower end between the upper ends of said plates and constituting a gripping jaw opposing the fixed jaw of said gripping member, said jaws when said gripping member and lever are moved in one direction gripping and advancing the flexible member toward said clamp thereby advancing the flexible member in an approximately straight line and when moved in the opposite direction releasing and passing over the taut portion of said flexible member.

In testimony whereof, I affix my signature in the presence of two witnesses.

JOSEPH S. SOUREK.

Witnesses:
C. E. HUMPHREY,
A. L. MCCLINTOCK.

Copies of this patent may be obtained for five cents each, by addressing the "Commissioner of Patents, Washington, D. C."